United States Patent
Yi et al.

(10) Patent No.: US 9,893,379 B2
(45) Date of Patent: Feb. 13, 2018

(54) LITHIUM ION BATTERY, SOLID ELECTROLYTE AND METHOD OF PREPARING THE SAME

(71) Applicant: BYD COMPANY LIMITED, Shenzhen, Guangdong (CN)

(72) Inventors: Guangui Yi, Shenzhen (CN); Yongjun Ma, Shenzhen (CN); Zizhu Guo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 11 days.

(21) Appl. No.: 15/242,228

(22) Filed: Aug. 19, 2016

(65) Prior Publication Data

US 2016/0359193 A1 Dec. 8, 2016

Related U.S. Application Data

(63) Continuation of application No. PCT/CN2015/075148, filed on Mar. 26, 2015.

(30) Foreign Application Priority Data

Mar. 28, 2014 (CN) .......................... 2014 1 0123184

(51) Int. Cl.
| | |
|---|---|
| *H01M 10/0562* | (2010.01) |
| *H01M 10/0525* | (2010.01) |
| *C01B 35/14* | (2006.01) |
| *C01B 25/45* | (2006.01) |
| *B26B 3/00* | (2006.01) |
| *C04B 35/447* | (2006.01) |
| *C04B 35/628* | (2006.01) |
| *B28B 3/00* | (2006.01) |

(52) U.S. Cl.
CPC .......... *H01M 10/0562* (2013.01); *B28B 3/00* (2013.01); *C01B 25/45* (2013.01); *C01B 35/143* (2013.01); *C04B 35/447* (2013.01); *C04B 35/62805* (2013.01); *C04B 35/62886* (2013.01); *H01M 10/0525* (2013.01); *C04B 2235/3203* (2013.01); *C04B 2235/3217* (2013.01); *C04B 2235/3225* (2013.01); *C04B 2235/3227* (2013.01); *C04B 2235/3241* (2013.01); *C04B 2235/3244* (2013.01); *C04B 2235/3286* (2013.01); *C04B 2235/3409* (2013.01); *C04B 2235/5436* (2013.01); *C04B 2235/5445* (2013.01); *C04B 2235/5454* (2013.01); *C04B 2235/602* (2013.01); *C04B 2235/6562* (2013.01); *H01M 2300/0068* (2013.01); *H01M 2300/0094* (2013.01); *Y02T 10/7011* (2013.01)

(58) Field of Classification Search
CPC ......... H01M 10/0525; H01M 10/0562; H01M 2300/0068; H01M 2300/0094; C04B 2235/3203; C04B 2235/3217; C04B 2235/3225; C04B 2235/3227; C04B 2235/3241; C04B 2235/3244; C04B 2235/3286; C04B 2235/3409; C04B 2235/5436; C04B 2235/5445; C04B 2235/5454; C04B 2235/602; C04B 2235/6562; C04B 35/447; C04B 35/62805; C04B 35/62886; B28B 3/00; C01B 25/45; C01B 35/143

See application file for complete search history.

(56) References Cited

U.S. PATENT DOCUMENTS

2013/0295469 A1  11/2013  Liang et al.

FOREIGN PATENT DOCUMENTS

| CN | 101114719 A | 1/2008 |
|---|---|---|
| CN | 101213703 A | 7/2008 |
| CN | 102132357 A | 7/2011 |
| CN | 103119772 A | 5/2013 |
| CN | 103125044 A | 5/2013 |
| EP | 2648265 A1 | 10/2013 |
| JP | 02250264 A | 10/1990 |
| JP | 0680462 A | 3/1994 |
| JP | 2010-118211 A | 5/2010 |
| JP | 2013-149373 A | 8/2013 |

OTHER PUBLICATIONS

Kelder, E.M. et al., "A new ceramic lithium solid electrolyte for rechargeable swing type batteries," Solid State Ionics, 1996, vol. 85, p. 285-291.

International Search Report and Written Opinion for International Application No. PCT/CN2015/075148, dated Jun. 5, 2015, 12 pages.

*Primary Examiner* — Carlos Barcena

(57) ABSTRACT

A solid electrolyte contains an internal component and an external component coated on a surface of the internal component. The internal component is represented by a formula $Li_{1+x}M_xZr_{2-x}(PO_4)_3$, M is one or more elements selected from a group consisting of Al, La, Cr, Ga, Y, and In, and $0.05 \leq x \leq 0.4$. The external component contains a plastic deformable material and has a conductivity of about $10^{-7}$ S/cm to about $10^{-5}$ S/cm. A method of preparing the solid electrolyte and a lithium ion battery including the solid electrolyte are also provided.

20 Claims, 2 Drawing Sheets

LITHIUM ION BATTERY, SOLID ELECTROLYTE AND METHOD OF PREPARING THE SAME

CROSS-REFERENCE TO RELATED APPLICATION

This application is a continuation application of International Application No. PCT/CN2015/075148, filed on Mar. 26, 2015, which claims priority to and benefits of Chinese Patent Application No. 201410123184.0, filed with the State Intellectual Property Office (SIPO) of the People's Republic of China on Mar. 28, 2014. The entire contents of the above referenced applications are hereby incorporated by reference.

FIELD

Embodiments of the disclosure generally relate to lithium ion batteries, and more particularly to a solid electrolyte, a method for preparing the solid electrolyte, and a lithium ion battery including the solid electrolyte.

BACKGROUND

Lithium ion batteries have high specific energy, good rechargeable performance and low usage loss, etc., so they are commonly used in consumer electronics and electric vehicles. At present, chemical batteries with high energy efficiency and high density generally use organic liquid electrolytes, which are volatile, flammable, and easily to cause liquid leakage. This kind of chemical battery needs to have multiple protection means, thus causing the battery system complex in structure and high in cost. Although gel polymer electrolytes have similar performances as the solid electrolyte such as high safety, and similar performances as the liquid electrolyte such as high conductivity and high rate capability, which solves the security problem of lithium ion battery to some extent. However, the gel polymer electrolyte also uses liquid organic solvent as a plasticizer, and thus the safety problem remains to be solved.

A solid inorganic electrolyte is also known as lithium super ionic conductor, which has high $Li^+$ conductivity, large transport-number, low conductance activation energy, good high temperature resistance, so it is widely applied in large power lithium ion batteries having high specific energy. Replacing the organic liquid electrolyte with a lithium ion solid inorganic electrolyte, disadvantages such as a short circuit in the battery and liquid leakage may be avoided, and the usage safety of lithium ion batteries may be enhanced. Thus, researches on solid electrolytes remain hot in the lithium ion battery field.

The current research on inorganic solid electrolyte for lithium ion batteries focuses on: LISICON ($Li_{2+2}Zn_{1-x}GeO_4$) solid electrolyte, NASICON (Na superionic conductor) solid electrolyte; solid electrolyte with a perovskite structure, crystalized lithium ion solid electrolyte with a garnet-like structure, glassy lithium ion solid electrolyte of oxide type, glassy lithium ion solid electrolyte of sulfide type, and glassy lithium ion solid electrolyte of a combination of oxide and sulfide. These solid electrolytes improve the security, and they can work at high temperatures. Especially, the NASICON compound is a lithium ion organic solid electrolyte which can conduct lithium ions at a high speed, so it is being widely used in developing solid electrolytes for completely solid-state secondary battery.

Currently, NASICON type electrolyte has been modified by ion doping and has obtained a higher room temperature ionic conductivity (for example, larger than $10^{-4}$s/cm). However, the NASICON type solid electrolyte has a high resistance at the grain boundary between solid particles, and poor compatibility with electrode materials, which greatly limits its application in completely solid-state lithium ion batteries.

Chinese patent Publication No. CN101894972A discloses a NASICON solid lithium ion electrolyte with a chemical formula $Li_{1+2(X1+X2)+2y+2Z}Al_{X1}Zn_yM_{2-(X1+X2)-y}Si_{X2}P_{3-(X1+X2)}O_{12-Z}$, where M is Ti, Ge, or Zr, and $0.1 \leq X1 \leq 0.5$, $0.1 \leq X2 \leq 0.5$, $0.01 \leq y \leq 0.1$, $0.5 \leq Z \leq 3.6$. The NASICON solid lithium ion electrolyte has lithium ion conductivity larger than $10^{-4}$ S/cm, but it still has a relatively higher resistance at grain boundary between the particles and poor compatibility with electrode materials.

SUMMARY

In viewing thereof, the present disclosure is directed to solve at least one problem existing in the art, for example, a higher resistance at grain boundary between the particles and poor compatibility with electrode materials.

Embodiments of one aspect the present disclosure provide a solid electrolyte. The solid electrolyte includes: an internal component represented by a formula $Li_{1+x}M_xZr_{2-x}(PO_4)_3$, M being one or more elements selected from the group consisting of Al, La, Cr, Ga, Y, and In, and $0.05 \leq x \leq 0.4$; and an external component coated on a surface of the internal component, the external component containing plastic deformable material and having a conductivity of about $10^{-7}$S/cm to about $10^{-5}$S/cm.

In some embodiments, the external component is represented by a formula $Li_{3-3y}B_yPO_4$, and $0 \leq y < 1$.

In some embodiments, the external component is selected from the group consisting of: $Li_3PO_4$, $Li_{0.18}B_{0.94}PO_4$, $Li_{0.15}B_{0.95}PO_4$, $Li_{0.12}B_{0.96}PO_4$, $Li_{0.09}B_{0.97}PO_4$, $Li_{0.06}B_{0.98}PO_4$, and combinations thereof.

In some embodiments, the external component is $Li_{0.15}B_{0.95}PO_4$.

In some embodiments, the content of the external component is about 0.5 wt % to about 10 wt %, based on the total weight of the solid electrolyte.

In some embodiments, the internal component is selected from the group consisting of $Li_{1.1}Y_{0.1}Zr_{1.9}(PO_4)_3$, $Li_{1.3}Y_{0.3}Zr_{1.7}(PO_4)_3$, $Li_{1.4}Y_{0.4}Zr_{1.6}(PO_4)_3$, $Li_{1.1}Al_{0.1}Zr_{1.9}(PO_4)_3$, $Li_{1.3}Al_{0.3}Zr_{1.7}(PO_4)_3$, $Li_{1.05}La_{0.05}Zr_{1.95}(PO_4)_3$, $Li_{1.1}Cr_{0.1}Zr_{1.9}(PO_4)_3$, $Li_{1.1}Ga_{0.1}Zr_{1.9}(PO_4)_3$, $Li_{1.1}In_{0.1}Zr_{1.9}(PO_4)_3$, and combinations thereof.

In some embodiments, the internal component has an average particle size of about 0.5 μm to about 10 μm.

In some embodiments, the external component has an average particle size of about 10 nm to about 30 nm.

Embodiments of another aspect the present disclosure provide a method for preparing a solid electrolyte. The method includes: providing an internal component represented by a formula $Li_{1+x}M_xZr_{2-x}(PO_4)_3$, M being one or more elements selected from the group consisting of Al, La, Cr, Ga, Y, and In, and $0.05 \leq x \leq 0.4$; providing an external component on a surface of the internal component to form a composite, the external component containing plastic deformable material and having a conductivity of about $10^{-7}$S/cm to about $10^{-5}$S/cm; and molding the composite.

In some embodiments, providing an internal component includes: mixing $ZrO_2$, $M_2O_3$, $NH_4H_2PO_4$ and a lithium source compound to form a mixture; and subjecting the mixture to a first calcination.

In some embodiments, the first calcination is performed at a temperature of about 750° C. to about 950° C. for about 4 hours to about 16 hours.

In some embodiments, the mixing is performed by ball milling.

In some embodiments, providing an internal component further includes cooling a product obtained from the first calcination.

In some embodiments, the amount of the lithium source compound is about 105 wt % to about 120 wt % of the stoichiometric amount.

In some embodiments, providing an external component on a surface of the internal component includes: mixing the internal component and raw materials of the external component in water to form a slurry; and bringing the pH value of the slurry to about 8 to about 11, such that the external component is coated on the surface of the internal component to form the composite.

In some embodiments, raw materials of the external component include LiOH and $NH_4H_2PO_4$.

In some embodiments, raw materials of the external component further include $H_3BO_3$.

In some embodiments, the method further includes drying the composite.

In some embodiments, the molding is performed by compression molding.

In some embodiments, the method further includes subjecting a product obtained from the molding to a second calcination.

In some embodiments, the second calcination includes: increasing the temperature of the product to about 900° C. to about 1200° C. with a heating rate of about 2° C./min to about 10° C./min, and keeping the product at about 900° C. to about 1200° C. for about 8 hours to about 24 hours.

In some embodiments, the external component is represented by a formula $Li_{3-3y}B_yPO_4$, and $0 \le y < 1$.

In some embodiments, the external component is selected from the group consisting of: $Li_3PO_4$, $Li_{0.18}B_{0.94}PO_4$, $Li_{0.15}B_{0.95}PO_4$, $Li_{0.12}B_{0.96}PO_4$, $Li_{0.09}B_{0.97}PO_4$, $Li_{0.06}B_{0.98}PO_4$, and combinations thereof.

In some embodiments, the external component is $Li_{0.15}B_{0.95}PO_4$.

In some embodiments, the content of the external component is about 0.5 wt % to about 10 wt %, based on the total weight of the solid electrolyte.

In some embodiments, the internal component is selected from the group consisting of $Li_{1.1}Y_{0.1}Zr_{1.9}(PO_4)_3$, $Li_{1.3}Y_{0.3}Zr_{1.7}(PO_4)_3$, $Li_{1.4}Y_{0.4}Zr_{1.6}(PO_4)_3$, $Li_{1.1}Al_{0.1}Zr_{1.9}(PO_4)_3$, $Li_{1.05}La_{0.05}Zr_{1.95}(PO_4)_3$, $Li_{1.1}Cr_{0.1}Zr_{1.9}(PO_4)_3$, $Li_{1.1}Ga_{0.1}Zr_{1.9}(PO_4)_3$, $Li_{1.1}In_{0.1}Zr_{1.9}(PO_4)_3$, and combinations thereof.

In some embodiments, the internal component has an average particle size of about 0.5 μm to about 10 μm.

In some embodiments, the external component has an average particle size of about 10 nm to about 30 nm.

Embodiments of a further aspect the present disclosure provide a lithium ion battery. The lithium ion battery includes: a cathode; an anode; and the solid electrolyte disposed between the cathode and the anode, the solid electrolyte being a solid electrolyte mentioned above or obtainable by the above-mentioned method for preparing the solid electrolyte.

With the solid electrolyte, the method for preparing the solid electrolyte, and the lithium ion battery according to embodiments of the present disclosure, ion conductivity in the boundary layer of the solid electrolyte may be improved, the boundary contact between an electrode and the solid electrolyte may be optimized and modified, and thus the performance of a completely solid-state lithium ion battery may be improved.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings, in which.

DETAILED DESCRIPTION

Figure 1:
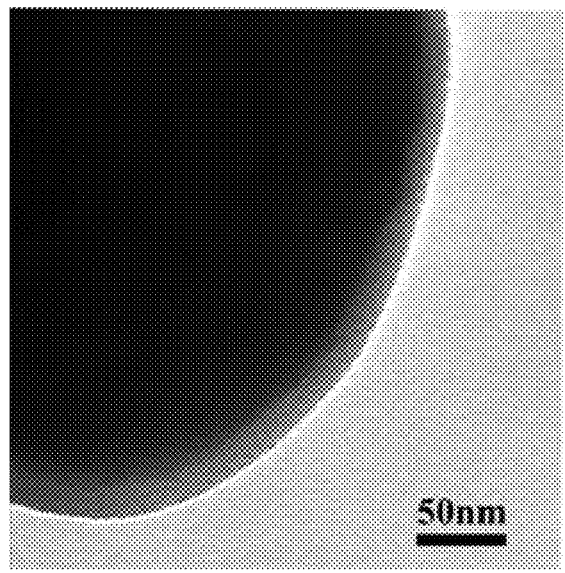
FIG. 1 is a transmission electron microscope (TEM) image of a solid electrolyte according to an embodiment of the present disclosure.

Reference will be made in detail to embodiments of the present disclosure. The embodiments described herein with reference to the accompany drawings are explanatory and illustrative, which are used to generally understand the present disclosure. The embodiments shall not be construed to limit the present disclosure.

For the purpose of the present description and of the following claims, the definitions of the numerical ranges always include the extremes unless otherwise specified.

In addition, terms such as "first" and "second" are used herein for purposes of description and are not intended to indicate or imply relative importance or significance.

A solid electrolyte according to embodiments of the present disclosure will be discussed below in details.

According to an embodiment of the present disclosure, the solid electrolyte includes an internal component and an external component coated on a surface of the internal component. The internal component has a chemical formula $Li_{1+x}M_xZr_{2-x}(PO_4)_3$, where M is one or more elements selected from Al, La, Cr, Ga, Y, and In, and $0.05 \le x \le 0.4$. The external component contains plastic deformable material and has a conductivity of about $10^{-7}$ S/cm to about $10^{-5}$ S/cm. The solid electrolyte according to embodiments of the present disclosure may be used in lithium ion batteries.

In some embodiments, the external component is selected from the group consisting of has a chemical formula $Li_{3-3y}B_yPO_4$, and $0 \le y < 1$. With this external component, the resistance of the grain boundary between grains of the internal component may be further reduced.

In some embodiments, the external component is selected from the group consisting of $Li_3PO_4$, $Li_{0.18}B_{0.94}PO_4$, $Li_{0.15}B_{0.95}PO_4$, $Li_{0.12}B_{0.96}PO_4$, $Li_{0.09}B_{0.97}PO_4$, $Li_{0.06}B_{0.98}PO_4$, and combinations thereof. In an embodiment, the external component is $Li_{0.15}B_{0.95}PO_4$. The external component contains plastic deformable material, such that the external component may be easily coated on the surface of the internal component, even if the internal component, such as one represented by chemical formula $Li_{1+x}M_xZr_{2-x}PO_4)_3$, has certain rigidity. In addition, these external components have relatively higher lithium ion conductivity and plastic deformability, and the electrochemical properties of the solid electrolyte may be improved when the external component is coated on the internal component.

In one embodiment, the solid electrolyte contains about 0.5 wt % to about 10 wt % of the external component, based on the total weight of the solid electrolyte. With this amount, both the coating effect and the conductivity of the solid electrolyte may be ensured. The inventors have found that, the coating effect is poor if the content of the external component is relatively lower; while the conduction of lithium ions may be influenced and thus the electrical conductivity of the solid electrolyte may be decreased if the content of the external component is relatively larger.

In some embodiments, the internal component is selected from the group consisting of $Li_{1.1}Y_{0.1}Zr_{1.9}(PO_4)_3$, $Li_{1.3}Y_{0.3}Zr_{1.7}(PO_4)_3$, $Li_{1.4}Y_{0.4}Zr_{1.6}(PO_4)_3$, $Li_{1.1}Al_{0.1}Zr_{1.9}(PO_4)_3$, $Li_{1.3}Al_{0.3}Zr_{1.7}(PO_4)_3$, $Li_{1.05}La_{0.05}Zr_{1.95}(PO_4)_3$, $Li_{1.1}Cr_{0.1}Zr_{1.9}(PO_4)_3$, $Li_{1.1}Ga_{0.1}Zr_{1.9}(PO_4)_3$, $Li_{1.1}In_{0.1}Zr_{1.9}(PO_4)_3$, and combinations thereof. In some embodiments, when used in a NASICON solid electrolyte, these internal components may show higher conductivity. In addition, these internal components are stable with air, water, and lithium, and thus have higher chemical stability.

There are no special limits to the average particle size of the internal component and the external component. In some embodiments, the internal component has an average particle size of about 0.5 μm to about 10 μm. In some embodiments, the external component has an average particle size of about 10 nm to about 30 nm.

Embodiments of the present disclosure also provide a method for preparing the solid electrolyte. The method includes the following steps S1 to S3.

At step S1, an internal component having a formula $Li_{1+x}M_xZr_{2-x}(PO_4)_3$ is provided, in which M is one or more elements selected from Al, La, Cr, Ga, Y, and In, and $0.05 \leq x \leq 0.4$.

In some embodiments, the step S1 includes steps of: mixing $ZrO_2$, $M_2O_3$, $NH_4H_2PO_4$ and a lithium source compound to form a mixture, and subjecting the mixture to a first calcination.

In some embodiments, the first calcination is performed at a temperature of about 750° C. to about 950° C. for about 4 hours to about 16 hours.

In some embodiments, the mixing is performed by ball milling.

In some embodiments, the step S1 further includes cooling a product obtained from the first calcination.

In some embodiments, the amount of the lithium source compound is about 105 wt % to about 120 wt % of the stoichiometric amount. Due to the loss of lithium ion during a following heating process, the required amount of the lithium source is larger than the stoichiometric amount. In other words, excess lithium source is added to form the mixture before the first calcination. With lithium source having the above-identified amount, the loss of lithium during the following heating process may be compensated, and no by products may be generated.

The lithium source can be any compound containing lithium elements. In some embodiments, the lithium source compound can be selected from the group consisting of lithium carbonate, lithium hydroxide, lithium hydroxide monohydrate, lithium nitrate, lithium acetate, and combinations thereof.

At step S2, an external component is coated on a surface of the internal component to form a composite material, in which the external component contains plastic deformable material and has a conductivity of about $10^{-7}$ S/cm to about $10^{-5}$ S/cm.

In some embodiments, the step S2 includes steps of: mixing the internal component and raw materials of the external component in water to form a slurry; and bringing the pH value of the slurry to about 8 to about 11, such that the external component is coated on the surface of the internal component to form the composite.

In some embodiments, raw materials of the external component include LiOH and $NH_4H_2PO_4$.

In some embodiments, raw materials of the external component further include $H_3BO_3$.

In some embodiments, the step S2 further includes drying the composite.

At step S3, the composite is molded.

In some embodiments, the step S3 is performed by compression molding.

In some embodiments, the step S3 further includes a step of subjecting a product obtained from the molding to a second calcination.

In some embodiments, the second calcination includes steps of: increasing the temperature of the product to about 900° C. to about 1200° C. with a heating rate of about 2° C./min to about 10° C./min, and keeping the product at about 900° C. to about 1200° C. for about 8 hours to about 24 hours.

In some embodiments, the composite can be molded into a structure having any shape and any thickness, such as a sheet, a column, etc., depending on specific design needs of the solid electrolyte.

It is to be noted that, descriptions of the solid electrolyte and components thereof, such as the internal component and the external component, and contents thereof, are also applied to those in embodiments of the methods, and therefore details thereof are omitted herein.

With the method for preparing the solid electrolyte according to embodiments of the present disclosure, which combines the advantages of both liquid-phase method and solid-phase method, the $Li_{1+x}M_xZr_{2-x}(PO_4)_3$ powders can be easily coated by the external component, and finally the solid electrolyte having a core-shell structure may be formed. In addition, the method may be simple to operate and easy to implement in industry.

Embodiments of the present disclosure further provide a lithium ion battery. The lithium ion battery includes a cathode, an anode, and the solid electrolyte described above (or obtainable from the method for preparing the solid electrolyte described above) disposed between the cathode and the anode.

Regarding the lithium ion battery, references of the solid electrolyte, components thereof, and the method for preparing the solid electrolyte are made to the above descriptions, and thus details thereof are omitted herein.

In some embodiments, materials used for the anode can be selected from the group consisting of lithium cobalt oxide, lithium manganese oxide, lithium iron phosphate, nickel-cobalt-manganese ternary materials, and combinations thereof.

In some embodiments, materials used for the cathode can be selected from the group consisting of lithium metal, graphite, mesophase carbon micro bead (MCMB), mesophase carbon fiber, soft carbon, hard carbon, lithium titanate, and combinations thereof.

Embodiments of the present disclosure further provide a method for preparing the lithium ion battery. The method includes assembling the cathode, anode, and solid electrolyte together. The assembled lithium ion battery may be a completely solid-state lithium ion battery.

According to embodiments of the present disclosure, the external component is coated on the surface of the $Li_{1+x}M_xZr_{2-x}(PO_4)_3$ internal component, which can reduce the resistance at grain boundary of grains of the internal component, and thus the solid electrolyte has relatively higher ion conductivity at room temperature (for example, larger than $10^{-4}$ S·cm$^{-1}$) and electrochemical stability (electrochemical window being larger than 5V), and the solid electrolyte may be used in producing lithium ion batteries. Further, the external component improves the stability of the internal component, and thus the ion conductivity of the grain boundary between grains of the solid electrolyte may be efficiently improved and the boundary contact between the electrode of the battery and the solid electrolyte may be optimized and enhanced. Accordingly, performances of the lithium ion battery, such as a completely solid-state lithium ion battery, may be improved, and the lithium ion battery may be applied in a variety of fields.

Hereinafter, the present disclosure will be described in details with reference to the following embodiments.

Embodiment 1

The present embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.1}Y_{0.1}Zr_{1.9}(PO_4)_3$. Then the powder mixture was placed on an alumina crucible and calcined at 800° C. for 6 h in a muffle furnace, and then cooled to obtain the internal component. The internal component was tested by X-ray diffraction (XRD), and the test results show that the internal component has a chemical formula $Li_{1.1}Y_{0.1}Zr_{1.9}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.15}B_{0.95}PO_4$ and the internal component was 98 wt % of the total weight of the solid electrolyte, and then the pH of the system was adjusted in such a way that a uniform gel of formula $Li_{0.15}B_{0.95}PO_4$ was generated and coated on the surface of the internal component to form a composite. The composite was dried. The coated component of the composite was tested by inductively coupled plasma-atomic emission spectrometry (ICP-AES) and phosphorus molybdenum blue colorimetric, and the results showed that the coated component has a chemical formula $Li_{0.15}B_{0.95}PO_4$.

(3) The dried composite was molded into sheets by pressing. The sheets were placed on an alumina crucible and the crucible was placed in a muffle furnace. Then the muffle furnace is operated, such that the temperature of the sheets was increased to 1000° C. with a heating rate of 2° C./min, and the sheets were kept at 1000° C. for 24h. The heated sheet was cooled to obtain a solid electrolyte Al for lithium ion batteries.

Embodiment 2

The present embodiment is substantially the same as Embodiment 1, with the exception that the internal component was formed by powders of $Li_2CO_3$, $Al_2O_3$, $ZrO_2$ and $NH_4H_2PO_4$ and amounts thereof were based on the stoichiometric ratio of $Li_{1.1}Al_{0.1}Zr_{1.9}(PO_4)_3$.

A solid electrolyte A2 for lithium ion batteries was obtained.

Embodiment 3

The present embodiment is substantially the same as Embodiment 1, with the exception that the internal component was formed by powders of $Li_2CO_3$, $Ga_2O_3$, $ZrO_2$ and $NH_4H_2PO_4$ and amounts thereof were based on the stoichiometric ratio of $Li_{1.1}Ga_{0.1}Zr_{1.9}(PO_4)_3$.

A solid electrolyte A3 for lithium ion batteries was obtained.

Embodiment 4

The present embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.3}Y_{0.3}Zr_{1.7}(PO_4)_3$. Then the powder mixture was placed on an alumina crucible and calcined at 850° C. for 12 h in a muffle furnace, and then cooled to obtain the internal component. The internal component was tested by XRD, and the test results show that the internal component has a chemical formula $Li_{1.3}Y_{0.3}Zr_{1.7}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.15}B_{0.95}PO_4$ and the internal component was 95 wt % of the total weight of the solid electrolyte, and then the pH of the system was adjusted in such a way that a uniform gel of formula $Li_{0.15}B_{0.95}PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_{0.15}B_{0.95}PO_4$.

(3) The dried composite was molded into sheets by pressing. The sheets were placed on an alumina crucible and the crucible was placed in a muffle furnace. Then the muffle furnace is operated, such that the temperature of the sheets was increased to 1100° C. with a heating rate of 2° C./min, and the sheets were kept at 1100° C. for 20 h. The heated sheet was cooled to obtain a solid electrolyte A4 for lithium ion batteries.

Embodiment 5

The present embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.3}Y_{0.3}Zr_{1.7}(PO_4)_3$. Then the powder mixture was placed on an alumina crucible and calcined at 850° C. for 12 h in a muffle furnace, and then cooled to obtain the internal component. The internal component was tested by XRD, and the test results show that the internal component has a chemical formula $Li_{1.3}Y_{0.3}Zr_{1.7}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.15}B_{0.95}PO_4$ and the internal component was 90 wt % of the total weight of the solid electrolyte, and then the pH of the system was adjusted in such a way that a uniform gel of formula $Li_{0.15}B_{0.95}PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_{0.15}B_{0.95}PO_4$.

(3) The dried composite was molded into sheets by pressing. The sheets were placed on an alumina crucible and the crucible was placed in a muffle furnace. Then the muffle furnace is operated, such that the temperature of the sheets was increased to 1100° C. with a heating rate of 2° C./min, and the sheets were kept at 1100° C. for 20 h. The heated sheet was cooled to obtain a solid electrolyte A5 for lithium ion batteries.

Embodiment 6

The present embodiment is substantially the same as Embodiment 4, with the exception that the internal component was formed by powders of $Li_2CO_3$, $Al_2O_3$, $ZrO_2$ and $NH_4H_2PO_4$ and amounts thereof were based on the stoichiometric ratio of $Li_{1.3}Al_{0.3}Zr_{1.7}(PO_4)_3$.

A solid electrolyte A6 for lithium ion batteries was obtained.

Embodiment 7

The present embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.3}Y_{0.3}Zr_{1.7}(PO_4)_3$. Then the powder mixture was placed on an alumina crucible and calcined at 850° C. for 12 h in a muffle furnace, and then cooled to obtain the internal component. The internal component was tested by XRD, and the test results show that the internal component has a chemical formula $Li_{1.3}Y_{0.3}Zr_{1.7}(PO_4)_3$.

(2) Powders of LiOH and $NH_4H_2PO_4$ and internal component powders were added into deionized water with stirring, in which amounts of these powders of LiOH and $NH_4H_2PO_4$ were based on the stoichiometric ratio of $Li_3PO_4$ and the internal component was 95 wt % of the total weight of the solid electrolyte, and then the pH of the system was adjusted in such a way that a uniform gel of formula $Li_3PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_3PO_4$.

(3) The dried composite was molded into sheets by pressing. The sheets were placed on an alumina crucible and the crucible was placed in a muffle furnace. Then the muffle furnace is operated, such that the temperature of the sheets was increased to 1100° C. with a heating rate of 2° C./min, and the sheets were kept at 1100° C. for 20 h. The heated sheet was cooled to obtain a solid electrolyte A7 for lithium ion batteries.

Embodiment 8

The present embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.3}Y_{0.3}Zr_{1.7}(PO_4)_3$. Then the powder mixture was placed on an alumina crucible and calcined at 950° C. for 10 h in a muffle furnace, and then cooled to obtain the internal component. The internal component was tested by XRD, and the test results show that the internal component has a chemical formula $Li_{1.3}Y_{0.3}Zr_{1.7}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.06}B_{0.98}PO_4$ and the internal component was 99.5 wt % of the total weight of the solid electrolyte, and then the pH of the system was adjusted in such a way that a uniform gel of formula $Li_{0.06}B_{0.98}PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_{0.06}B_{0.98}PO_4$.

(3) The dried composite was molded into sheets by pressing. The sheets were placed on an alumina crucible and the crucible was placed in a muffle furnace. Then the muffle furnace is operated, such that the temperature of the sheets was increased to 1050° C. with a heating rate of 2° C./min, and the sheets were kept at 1050° C. for 12 h. The heated sheet was cooled to obtain a solid electrolyte A8 for lithium ion batteries.

Embodiment 9

The present embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.4}Y_{0.4}Zr_{1.6}(PO_4)_3$. Then the powder mixture was placed on an alumina crucible and calcined at 900° C. for 8 h in a muffle furnace, and then cooled to obtain the internal component. The internal component was tested by XRD, and the test results show that the internal component has a chemical formula $Li_{1.4}Y_{0.4}Zr_{1.6}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.09}B_{0.97}PO_4$ and the internal component was 92 wt % of the total weight of the solid electrolyte, and then the pH of the system was adjusted in such a way that a uniform gel of formula $Li_{0.09}B_{0.97}PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_{0.09}B_{0.97}PO_4$.

(3) The dried composite was molded into sheets by pressing. The sheets were placed on an alumina crucible and the crucible was placed in a muffle furnace. Then the muffle furnace is operated, such that the temperature of the sheets was increased to 1150° C. with a heating rate of 2° C./min, and the sheets were kept at 1150° C. for 8 h. The heated sheet was cooled to obtain a solid electrolyte A9 for lithium ion batteries.

Embodiment 10

The present embodiment provides a method for preparing a solid electrolyte and a solid electrolyte prepared thereof. The method includes following steps.

(1) Powders of $Li_2CO_3$, $La_2O_3$, $ZrO_2$ and $NH_4H_2PO_4$ were mixed together and ball milled to form a powder mixture, in which amounts of these powders were based on the stoichiometric ratio of $Li_{1.05}La_{0.05}Zr_{1.95}(PO_4)_3$. Then the powder mixture was placed on an alumina crucible and calcined at 750° C. for 16 h in a muffle furnace, and then cooled to obtain the internal component. The internal component was tested by XRD, and the test results show that the internal component has a chemical formula $Li_{1.05}La_{0.05}Zr_{1.95}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.12}B_{0.96}PO_4$ and the internal component was 95 wt % of the total weight of the solid electrolyte, and then the pH of the system was adjusted in such a way that a uniform gel of formula $Li_{0.12}B_{0.96}PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_{0.12}B_{0.96}PO_4$.

(3) The dried composite was molded into sheets by pressing. The sheets were placed on an alumina crucible and the crucible was placed in a muffle furnace. Then the muffle furnace is operated, such that the temperature of the sheets was increased to 1200° C. with a heating rate of 2° C./min, and the sheets were kept at 1200° C. for 8 h. The heated sheet was cooled to obtain a solid electrolyte A10 for lithium ion batteries.

Embodiment 11

The present embodiment provides a method for preparing a solid electrolyte and a solid electrolyte prepared thereof. The method includes following steps.

(1) Powders of $Li_2CO_3$, $Cr_2O_3$, $ZrO_2$ and $NH_4H_2PO_4$ were mixed together and ball milled to form a powder mixture, in which amounts of these powders were based on the stoichiometric ratio of $Li_{1.1}Cr_{0.1}Zr_{1.9}(PO_4)_3$. Then the powder mixture was placed on an alumina crucible and calcined at 950° C. for 4 h in a muffle furnace, and then cooled to obtain the internal component. The internal component was tested by XRD, and the test results show that the internal component has a chemical formula $Li_{1.1}Cr_{0.1}Zr_{1.9}(PO_4)_3$.

(2) Powders of LiOH, $H_3BO_3$ and $NH_4H_2PO_4$ and internal component powders were added into deionized water with stirring, in which amounts of these powders of LiOH, $H_3BO_3$ and $NH_4H_2PO_4$ were based on the stoichiometric ratio of $Li_{0.18}B_{0.94}PO_4$ and the internal component was 94 wt % of the total weight of the solid electrolyte, and then the pH of the system was adjusted in such a way that a uniform gel of formula $Li_{0.18}B_{0.94}PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_{0.18}B_{0.94}PO_4$.

(3) The dried composite was molded into sheets by pressing. The sheets were placed on an alumina crucible and the crucible was placed in a muffle furnace. Then the muffle furnace is operated, such that the temperature of the sheets was increased to 900° C. with a heating rate of 2° C./min, and the sheets were kept at 900° C. for 24 h. The heated sheet was cooled to obtain a solid electrolyte A11 for lithium ion batteries.

Embodiment 12

The present embodiment provides a method for preparing a solid electrolyte and a solid electrolyte prepared thereof. The method includes following steps.

(1) Powders of $Li_2CO_3$, $In_2O_3$, $ZrO_2$ and $NH_4H_2PO_4$ were mixed together and ball milled to form a powder mixture, in which amounts of these powders were based on the stoichiometric ratio of $Li_{1.1}In_{0.1}Zr_{1.9}(PO_4)_3$. Then the powder mixture was placed on an alumina crucible and calcined at 900° C. for 8 h in a muffle furnace, and then cooled to obtain the internal component. The internal component was tested by XRD, and the test results show that the internal component has a chemical formula $Li_{1.1}In_{0.1}Zr_{1.9}(PO_4)_3$.

(2) Powders of LiOH and $NH_4H_2PO_4$ and internal component powders were added into deionized water with stirring, in which amounts of these powders of LiOH and $NH_4H_2PO_4$ were based on the stoichiometric ratio of $Li_3PO_4$ and the internal component was 92 wt % of the total weight of the solid electrolyte, and then the pH of the system was adjusted in such a way that a uniform gel of formula $Li_3PO_4$ was generated and coated on the surface of the internal component to form a composite. The composite was dried. The coated component of the composite was tested by ICP-AES and phosphorus molybdenum blue colorimetric, and the results showed that the coated component has a chemical formula $Li_3PO_4$.

(3) The dried composite was molded into sheets by pressing. The sheets were placed on an alumina crucible and the crucible was placed in a muffle furnace. Then the muffle furnace is operated, such that the temperature of the sheets was increased to 1150° C. with a heating rate of 2° C./min, and the sheets were kept at 1150° C. for 8 h. The heated sheet was cooled to obtain a solid electrolyte A12 for lithium ion batteries.

Comparative Embodiment 1

The present comparative embodiment provides a method for preparing a solid electrolyte and a solid electrolyte prepared thereof. The method includes following steps.

(1) Powders of $Li_2CO_3$, $Y_2O_3$, $ZrO_2$ and $NH_4H_2PO_4$ were mixed together and ball milled to form a powder mixture, in which amounts of these powders were based on the stoichiometric ratio of $Li_{1.3}Y_{0.3}Zr_{1.7}(PO_4)_3$. Then the powder mixture was placed on an alumina crucible and calcined at 850° C. for 12 h in a muffle furnace, and then cooled to obtain $Li_{1.3}Y_{0.3}Zr_{1.7}(PO_4)_3$ powders.

(2) $Li_{1.3}Y_{0.3}Zr_{1.7}(PO_4)_3$ powders were placed on an alumina crucible and the crucible was placed in a muffle furnace. Then the muffle furnace is operated, such that the temperature of the powders was increased to 1100° C. with a heating rate of 2° C./min, and the sheets were kept at 1100° C. for 20 h. The heated sheet was cooled to obtain a solid electrolyte CA1 for lithium ion batteries.

Comparative Embodiment 2

A solid electrolyte CA2 having a formula $Li_{2.42}Al_{0.1}Zn_{0.01}Zr_{1.79}Si_{0.1}P_{2.8}O_{11.5}S_{0.5}$ was prepared according to Example 1 of Chinese patent publication No. CN101894972A.

Tests (1) TEM

Figure 2:
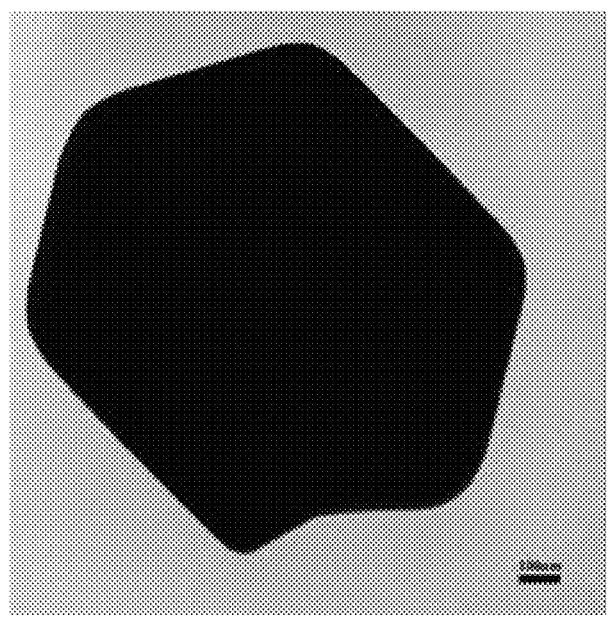
FIG. 2 is a TEM image of a solid electrolyte according to another embodiment of the present disclosure.
Figure 3:
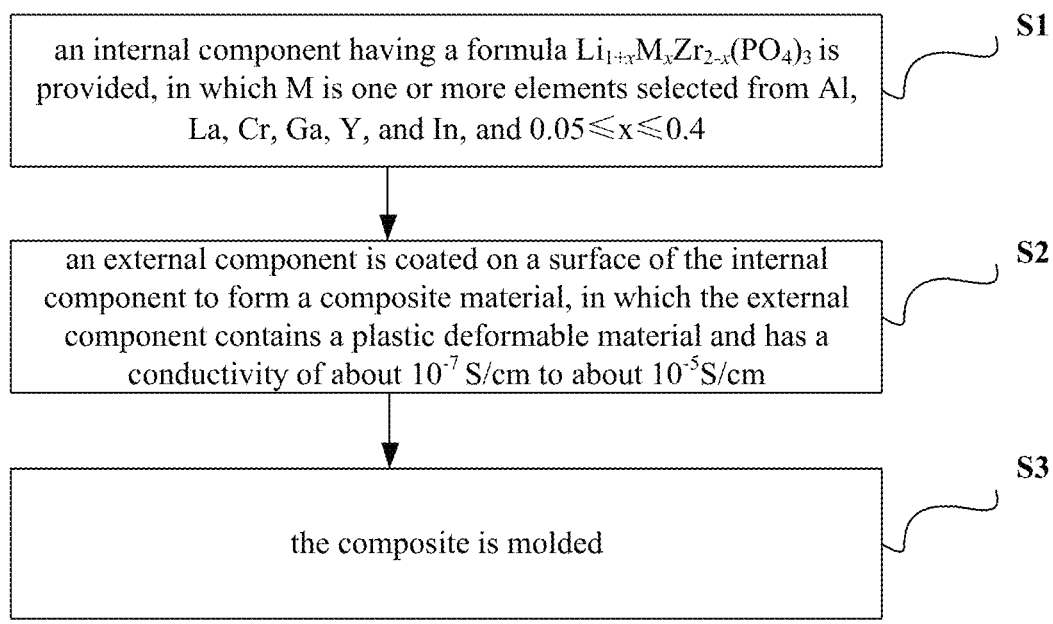
FIG. 3 is a flow chart showing a method of preparing a solid electrolyte according to an embodiment of the present disclosure.

Solid electrolytes A4 and CA1 were tested with a TEM, and the TEM images are shown in FIG. 1 and FIG. 2 respectively.

(2) Ionic Conductivity

Ionic conductivity of each of solid electrolytes A1 to A12, CA1 and CA2 was tested with following steps. Two gold films as conductive electrodes were formed on two surfaces of the solid electrolyte by sputtering to obtain a test sample, then alternative current impedance of the test sample is carried out in an electrochemical workstation, in which the test of alternative current impedance covered a frequency from $10^5$ Hz to 1 Hz. Then the total impedance R of the solid electrolyte was calculated. The ionic conductivity σ was calculated by the following formula:

$$\sigma = L/A \cdot R,$$

where L is the thickness of the solid electrolyte, A is the surface area of the gold film, and R is the total impedance of the solid electrolyte. In embodiments of the present disclosure, L=0.2 cm, A=1.76 $cm^2$.

The results are shown in Table 1.

(3) Electrochemical Window

Electrochemical window of each of solid electrolytes A1 to A12, CA1 and CA2 was tested with following steps. Two surfaces of the solid electrolyte was formed with a Li sheet and a Pt sheet by pressing to form a half-cell, and the cyclic voltammetry curve of the half-cell was measured in an electrochemical workstation.

The results are shown in Table 1.

TABLE 1

|     | Total impedance (Ω) | Ionic conductivity (S/cm) | Electrochemical window (V) |
| --- | --- | --- | --- |
| A1  | 1108 | $1.02 \times 10^{-4}$ | >5 V |
| A2  | 1334 | $8.47 \times 10^{-5}$ | >5 V |
| A3  | 1733 | $6.52 \times 10^{-5}$ | >5 V |
| A4  | 438  | $2.58 \times 10^{-4}$ | >5 V |
| A5  | 698  | $1.62 \times 10^{-4}$ | >5 V |
| A6  | 830  | $1.36 \times 10^{-4}$ | >5 V |
| A7  | 2686 | $4.23 \times 10^{-5}$ | >5 V |
| A8  | 724  | $1.56 \times 10^{-4}$ | >5 V |
| A9  | 526  | $2.15 \times 10^{-4}$ | >5 V |
| A10 | 2073 | $5.45 \times 10^{-5}$ | >5 V |
| A11 | 4021 | $2.81 \times 10^{-5}$ | >5 V |
| A12 | 3466 | $3.26 \times 10^{-5}$ | >5 V |
| CA1 | 1808 | $6.25 \times 10^{-5}$ | >5 V |
| CA2 | 1046 | $7.08 \times 10^{-5}$ | >5 V |

As can be seen from Table 1, the ionic conductivity of the solid electrolyte CA1 prepared by COMPARATIVE EMBODIMENT 1 is $6.25 \times 10^{-5}$ S/cm at room temperature; the ionic conductivity of the solid electrolyte A4 prepared by the EMBODIMENT 4 is $2.58 \times 10^{-4}$ S/cm at room temperature (the internal component is $Li_{1.3}Y_{0.3}Zr_{1.7}(PO_4)_3$, and the external component is $Li_{0.15}B_{0.95}PO_4$, and the external component was 5 wt % of the total weight of the solid electrolyte); the ionic conductivity of the solid electrolyte A5 prepared by the EMBODIMENT 5 is $1.62 \times 10^{-4}$ S/cm at room temperature (the internal component is $Li_{1.3}Y_{0.3}Zr_{1.7}(PO_4)_3$, and the external component is $Li_{0.15}B_{0.95}PO_4$, and the external component was 10 wt % of the total weight of the solid electrolyte); the ionic conductivity of the solid electrolyte A6 prepared by the EMBODIMENT 6 is about $1.36 \times 10^{-4}$ S/cm at room temperature (the internal component is $Li_{1.3}Al_{0.3}Zr_{1.7}(PO_4)_3$, and the external component is $Li_{0.15}B_{0.95}PO_4$, and the external component was 5 wt % of the total weight of the solid electrolyte). It can be concluded that, with a plastic deformable film, such as the external component $Li_{0.15}B_{0.95}PO_4$ coated on the surface of the internal component having a formula $Li_{1+x}M_xZr_{2-x}(PO_4)_3$, the resistance at the grain boundary between grains of the internal component is reduced, and lithium ion conductivity of the solid electrolyte is improved. In addition, the solid electrolytes of embodiments of the present disclosure have an electrochemical window of more than 5V, and thus can be widely used in various different fields.

As can be seen from FIGS. 1-2, the surface of the solid electrolyte of embodiments of the present disclosure includes materials which are obviously different from the internal component, which indicates that the external component, such as $Li_{0.15}B_{0.95}PO_4$, may be coated on the surface of the internal component, which also proves that the solid electrolyte of embodiments of the present disclosure has a core-shell structure, i.e. a structure including an internal component and an external component covered or coated on the internal component.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A solid electrolyte comprising:
   an internal component represented by a formula $Li_{1+x}M_xZr_{2-x}(PO_4)_3$, M being one or more elements selected from the group consisting of Al, La, Cr, Ga, Y, and In, and 0.05≤x≤0.4; and
   an external component coated on a surface of the internal component, the external component comprising a plastic deformable material and having a conductivity of about $10^{-7}$ S/cm to about $10^{-5}$ S/cm.

2. The solid electrolyte of claim 1, wherein the external component is represented by a formula $Li_{3-3y}B_yPO_4$, and $0 \leq y < 1$.

3. The solid electrolyte of claim 2, wherein the external component is selected from the group consisting of: $Li_3PO_4$, $Li_{0.18}B_{0.94}PO_4$, $Li_{0.15}B_{0.95}PO_4$, $Li_{0.12}B_{0.96}PO_4$, $Li_{0.09}B_{0.97}PO_4$, $Li_{0.06}B_{0.98}PO_4$, and combinations thereof.

4. The solid electrolyte of claim 1, wherein the content of the external component is about 0.5 wt % to about 10 wt %, based on the total weight of the solid electrolyte.

5. The solid electrolyte of claim 1, wherein the internal component is selected from the group consisting of $Li_{1.1}Y_{0.1}Zr_{1.9}(PO_4)_3$, $Li_{1.3}Y_{0.3}Zr_{1.7}(PO_4)_3$, $Li_{1.4}Y_{0.4}Zr_{1.6}(PO_4)_3$, $Li_{1.1}Al_{0.1}Zr_{1.9}(PO_4)_3$, $Li_{1.3}Al_{0.3}Zr_{1.7}(PO_4)_3$, $Li_{1.05}La_{0.05}Zr_{1.95}(PO_4)_3$, $Li_{1.1}Cr_{0.1}Zr_{1.9}(PO_4)_3$, $Li_{1.1}Ga_{0.1}Zr_{1.9}(PO_4)_3$, $Li_{1.1}In_{0.1}Zr_{1.9}(PO_4)_3$, and combinations thereof.

6. The solid electrolyte of claim 1, wherein the internal component has an average particle size of about 0.5 μm to about 10 μm, and the external component has an average particle size of about 10 nm to about 30 nm.

7. A method for preparing a solid electrolyte, comprising:
providing an internal component represented by a formula $Li_{1+x}M_xZr_{2-x}(PO_4)_3$, M being one or more elements selected from a group consisting of Al, La, Cr, Ga, Y, and In, and $0.05 \leq x \leq 0.4$; and
providing an external component on a surface of the internal component to form a composite, the external component comprising a plastic deformable material and having a conductivity of about $10^{-7}$ S/cm to about $10^{-5}$ S/cm.

8. The method of claim 7, wherein providing an internal component comprises:
mixing $ZrO_2$, $M_2O_3$, $NH_4H_2PO_4$ and a lithium source compound to form a mixture; and
subjecting the mixture to a first calcination.

9. The method of claim 8, wherein the mixing is performed by ball milling, and the first calcination is performed at a temperature of about 750° C. to about 950° C. for about 4 hours to about 16 hours.

10. The method of claim 8, wherein providing an internal component further comprises cooling a product obtained from the first calcination.

11. The method of claim 8, wherein the amount of the lithium source compound is about 105 wt % to about 120 wt % of the stoichiometric amount.

12. The method of claim 7, wherein providing an external component on a surface of the internal component comprises:
mixing the internal component and raw materials of the external component in water to form a slurry; and
bringing the pH value of the slurry to about 8 to about 11, such that the external component is coated on the surface of the internal component to form the composite.

13. The method of claim 12, wherein raw materials of the external component comprise LiOH and $NH_4H_2PO_4$.

14. The method of claim 13, wherein raw materials of the external component further comprise $H_3BO_3$.

15. The method of claim 12, further comprising drying the composite.

16. The method of claim 7, further comprising molding the composite, wherein the molding is performed by compression molding.

17. The method of claim 16, further comprising subjecting a product obtained from the molding to a second calcination.

18. The method of claim 17, wherein the second calcination comprises:
increasing the temperature of the product to about 900° C. to about 1200° C. with a heating rate of about 2° C./min to about 10° C./min, and
keeping the product at about 900° C. to about 1200° C. for about 8 hours to about 24 hours.

19. The method of claim 7, wherein the internal component has an average particle size of about 0.5 μm to about 10 μm, and the external component has an average particle size of about 10 nm to about 30 nm.

20. A lithium ion battery comprising:
a cathode;
an anode; and
a solid electrolyte disposed between the cathode and the anode, wherein the solid electrolyte comprises:
an internal component represented by a formula $Li_{1+x}M_xZr_{2-x}(PO_4)_3$, M being one or more elements selected from the group consisting of Al, La, Cr, Ga, Y, and In, and $0.05 \leq x \leq 0.4$; and
an external component coated on a surface of the internal component, the external component comprising a plastic deformable material and having a conductivity of about $10^{-7}$ S/cm to about $10^{-5}$ S/cm.

* * * * *